(12) United States Patent
Werjefelt

(10) Patent No.: US 8,213,101 B2
(45) Date of Patent: Jul. 3, 2012

(54) GAS ACTIVATED EMERGENCY VISION DEVICE

(76) Inventor: Bertil R. L. Werjefelt, Kaneohe, HI (US)

( * ) Notice: Subject to any disclaimer, the term of this patent is extended or adjusted under 35 U.S.C. 154(b) by 195 days.

(21) Appl. No.: 12/461,843

(22) Filed: Aug. 26, 2009

(65) Prior Publication Data

US 2009/0316390 A1 Dec. 24, 2009

Related U.S. Application Data

(62) Division of application No. 11/083,091, filed on Mar. 18, 2005, now Pat. No. 7,583,455.

(51) Int. Cl.
*G02B 5/00* (2006.01)
*G02B 7/00* (2006.01)
*G02B 27/00* (2006.01)

(52) U.S. Cl. ....................................................... 359/894

(58) Field of Classification Search ................... 362/109; 244/118.5; 359/894, 895; 91/5; 92/78, 89, 92/90, 93, 94

See application file for complete search history.

(56) References Cited

U.S. PATENT DOCUMENTS

| | | | |
|---|---|---|---|
| 2,087,081 A | 7/1937 | Bock | |
| D138,690 S | 9/1944 | Downing | |
| 3,619,042 A | 11/1971 | Lazar | |
| D256,129 S | 7/1980 | Mitsui | |
| 4,515,437 A | 5/1985 | Story | |
| 4,832,287 A | 5/1989 | Werjefelt | |
| 5,087,112 A | 2/1992 | Feinbloom | |
| D325,041 S | 3/1992 | Wissing et al. | |
| 5,202,798 A | 4/1993 | Takei et al. | |
| D337,339 S | 7/1993 | An | |
| 5,318,250 A | 6/1994 | Werjefelt | |
| D355,663 S | 2/1995 | Van Cort | |
| 5,619,370 A | 4/1997 | Guinosso | |
| 5,947,415 A | 9/1999 | Werjefelt | |
| 6,082,673 A | 7/2000 | Werjefelt | |
| 6,191,899 B1 | 2/2001 | Fuchs | |
| 6,460,804 B2 | 10/2002 | Werjefelt | |

*Primary Examiner* — Tien Dinh
*Assistant Examiner* — Michael A Fabula
(74) *Attorney, Agent, or Firm* — Shlesinger, Arkwright & Garvey LLP

(57) ABSTRACT

An emergency vision device, comprises a collapsible tube made of airtight material and having an expanded form and a deflated stowage form; first and second clear members disposed at respective first and second ends of the tube to enable a user to see through the tube and observe a source of information at a distal end of the tube while smoke or other particulate matter is in the environment; and a portable gas cylinder having compressed clear gas and an outlet operably connected to the interior of the tube. The gas cylinder is operable to release the clear gas to fill the interior of the tube to expand the tube to the expanded form.

10 Claims, 2 Drawing Sheets

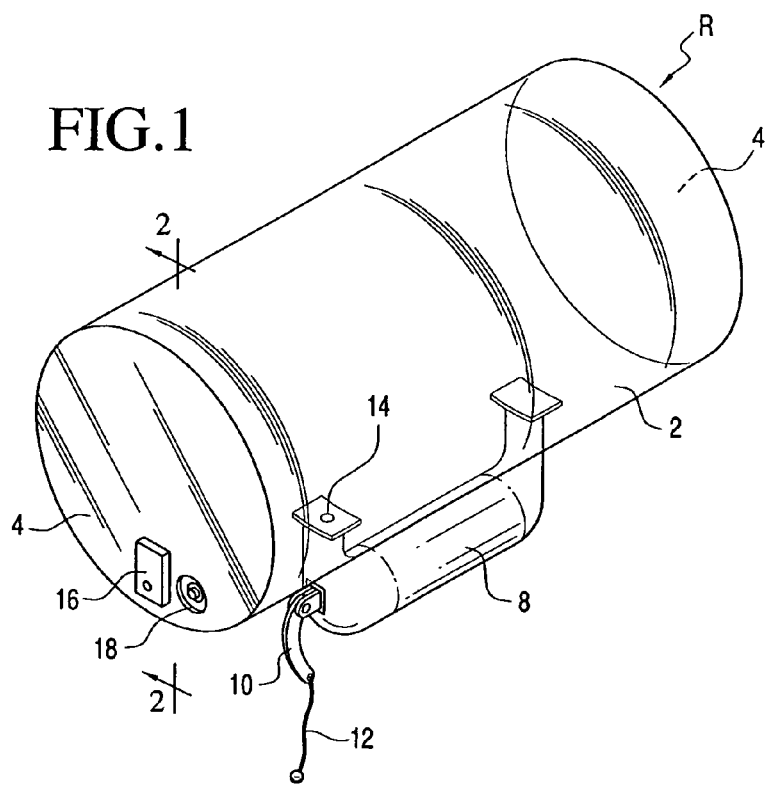
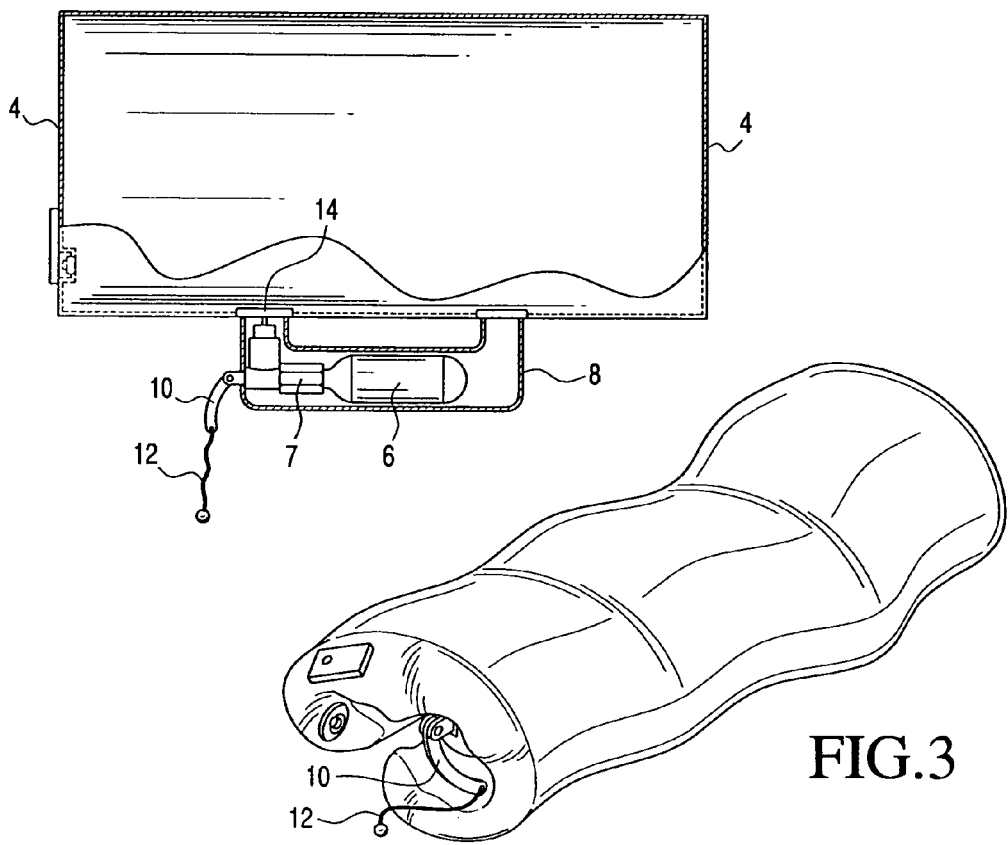

GAS ACTIVATED EMERGENCY VISION DEVICE

RELATED APPLICATIONS

This is a division of application Ser. No. 11/083,091, filed Mar. 18, 2005, now U.S. Pat. No. 7,583,455.

FIELD OF THE INVENTION

The present invention relates generally to an apparatus to enable an operator to maintain visual contact with instruments or other visual sources of data after smoke and/or particulate from a fire or other sources has invaded the operator's environment. In particular, the present invention relates to a gas activated expandable hand-held enclosure that bridges the gap between the pilot and the windshield and/or instrument panel along the pilot's line of sight and provide a clear viewing path to the windshield and/or the instrument panel, thereby providing him with vital information for guiding the aircraft to a safe landing after smoke and/or particulate matter invades the cockpit area.

BACKGROUND OF THE INVENTION

Emergency vision devices for aiding pilots to see through vision-impairing smoke to maintain their visual access to critical information, such as that provided by an instrument panel and visual information available outside the cockpit to help pilots safely guide their aircrafts are disclosed in U.S. Pat. Nos. 4,832,287; 5,318,250; 5,202,798; 5,947,415 and 6,460,804, all issued to Bertil Werjefelt.

The present invention is an improvement over U.S. Pat. No. 6,460,804.

OBJECTS AND SUMMARY OF THE INVENTION

It is an object of the present invention to provide an emergency vision device that is relatively compact and easily fits within a brief case.

It is another object of the present invention to provide an emergency vision device that is portable, lightweight and easily handled by the operator to assist him in various procedures and checklists required to operate an aircraft while under emergency smoke conditions.

It is still another object of the present invention to provide an emergency vision device that takes on a smaller shape for stowage when not in use and uses compressed gas to inflate it for deployment when the need arises.

In summary, the present invention provides an emergency vision device, comprising a collapsible tube made of airtight material and having an expanded form and a deflated stowage form; first and second clear members disposed at respective first and second ends of the tube to enable a user to see through the tube and observe a source of information at a distal end of the tube while smoke or other particulate matter is in the environment; and a portable gas cylinder having compressed clear gas and an outlet operably connected to the interior of the tube. The gas cylinder is operable to release the clear gas to fill the interior of the tube to expand the tube to the expanded form.

These and other objects of the invention will be apparent from the following detailed description.

BRIEF DESCRIPTION OF THE DRAWINGS

FIG. 1 is a perspective view of an emergency vision device, shown in its deployed inflated form.

FIG. 2 is a partial cross-sectional view taken along line 2-2 of FIG. 1.

FIG. 3 is a perspective view of the device shown in FIG. 1 in a deflated stowage form.

DETAILED DESCRIPTION OF THE INVENTION

Figure 4:
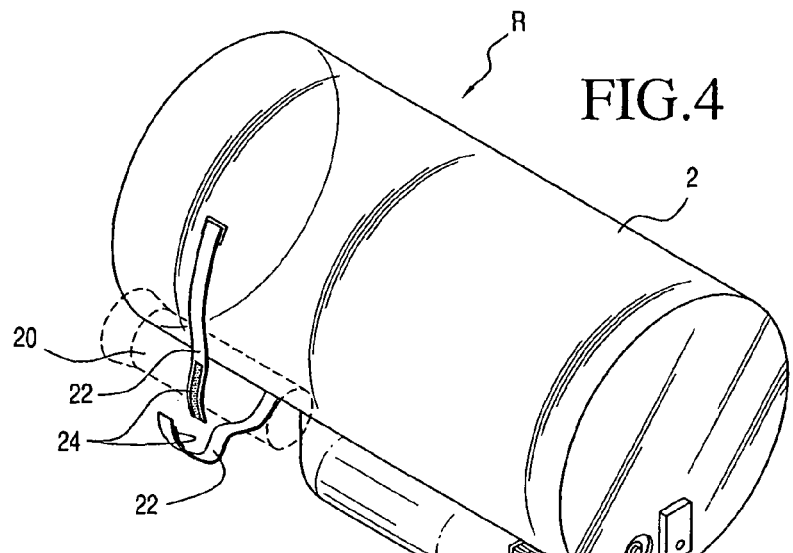
FIG. 4 is a perspective view of the emergency vision device of FIG. 1, showing straps for holding a flashlight.

An emergency vision device R made in accordance with the present invention is disclosed in FIGS. 1 and 2 in a deployed inflated form. The device is in the form of a collapsible hand-held tube 2 made from an airtight fabric or other suitable materials. The tube 2 may be made from transparent or opaque material. The tube 2 is closed off at each end with respective transparent member 4, such as clear plastic sheet, to allow the user to see through the tube. The tube 2 is sealed from the outside such that smoke or other particulate from a fire is prevented from invading the interior of the tube. In this manner, a clear view from one end to the opposite end of the tube is maintained for the user.

A gas cylinder 6 containing clear compressed gas is disposed within a hollow handle 8. The gas cylinder. 6 is screwed to a standard valve assembly 7, such as the one commonly used in a hand-held fire extinguisher. The gas cylinder 6 is used inflate the tube 2 from its deflated stowage form (see FIG. 3) to its deployed inflated form. The valve assembly 7 includes an activation lever 10 the operation of which causes the gas to flow into the interior of the tube 2, causing the tube to expand to its deployed form. A string 12 is advantageously secured to one end of the lever 10 for convenience so that when the tube 2 is in the deflated form, as shown in FIG. 3, the string 12 may be positioned in a visible location to the user for quick activation of the gas cylinder when the need arises to deploy the device R. An outlet 14 of the valve assembly 7 operably communicates with the interior of the tube 2 to fill and inflate the tube 2 when the gas from cylinder 6 is released.

The handle 8 is made in a standard way such that it can be opened to provide access to the cylinder 6 for replacement after each use.

A light source 16 with its own battery power and switch may be provided at one end of the tube 2.

A closeable outlet 18 is provided to exhaust the gas from the interior of the tube 2 when deflating the device to its deflated and stowage form.

When not in use, the device R is in a deflated stowage form, as shown in FIG. 3, and may be placed within a pouch (not shown). To deploy the device R, the lever 10 is operated in the conventional manner, activating the cylinder to release its content to the interior of the tube 2 via the inlet 14, thereby inflating the tube 2. The light 12 provides illumination on the object requiring visual visibility to the operator.

In lieu of the light 16 or in addition to it, a flashlight 20 may be attached to the outside of the tube 2. Straps 22 with hook-and-loop fastener 24 are attached to the tube 2 for securing the flashlight. Other conventional ways to attach the flashlight to the tube may be used.

Although the tube 2 is shown with a circular cross-section, generally in the shape of a cylinder, it should be understood that any cross-sectional shape would be applicable as long as a clear visibility path is provided through the tube. In another embodiment, the tube 2 is surrounded and attached to a network of substantially smaller tubes 26. The tubes 26 comprise end ring tubes 28 disposed at the respective front and rear end of the tube 2. Intermediate ring tubes 30 are disposed intermediate the front and rear end of the tube 2. Longitudinal tubes 32 connect the end ring tubes 28 and the intermediate ring tubes 30 into one communicating network of tubes. The network of tubes 26 provides a supporting framework when inflated to the tube 2. Although a specific arrangement of small tubes 28, 30 and 32 is disclosed, other arrangements may be used that would provide the same function of supporting the tube 2 in the deployed form. The ring tubes 28 and 30 and the longitudinal tubes 32 have a cross-sectional area substantially smaller than the cross-sectional area of the main tube 2.

Figure 6:
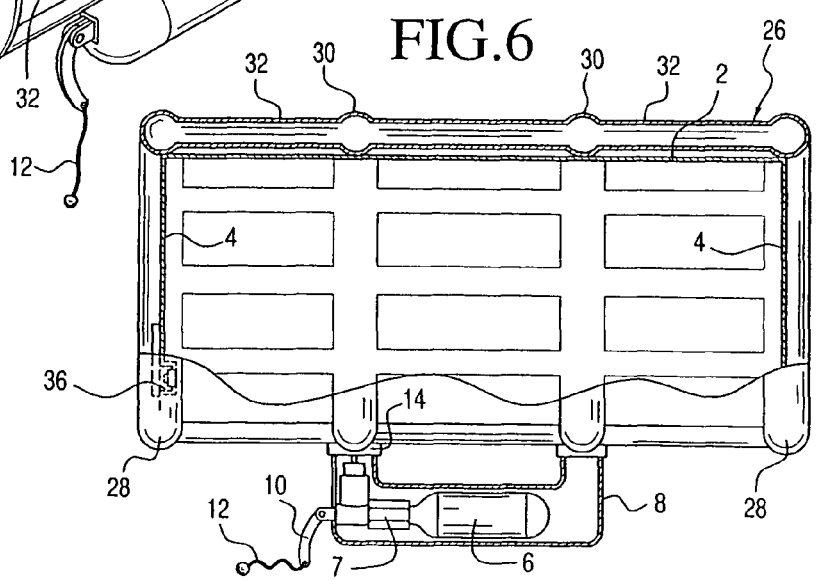
FIG. 6 is a partial cross-sectional view across taken along line 6-6 of FIG. 5.

The outlet 14 of the valve assembly 7 communicates with the network of tubes 26, preferably via one of the intermediate ring tubes 30, as best shown in FIG. 6. In this manner, the compressed gas fills up the network of tubes 26 relatively quickly, with the gas filling up the ring tube which functions as a header, connecting the longitudinal tubes 32 and the other ring tubes to facilitate the flow of the gas. Advantageously, the gas cylinder 6 only needs sufficient capacity to fill up the network of tubes 26, which is much smaller than the volume required to fill up the tube 2. Thus, the gas cylinder 6 for this embodiment can be made smaller and lighter than the one in the embodiment of FIG. 1.

A filter 34 is disposed at one end of the tube to allow ambient air to fill the volume of the tube as it expands under the action of the network of tubes 26 as it fills up with the compressed gas from the cylinder 6. The filter 34 is designed to filter the ambient air during an emergency smoke situation and provide clear air to fill the volume of the tube 2. The filter 8 is preferably a HEPA filter.

A closable port or opening 36 is provided to allow the air inside the network of tubes 26 to be exhausted when the tube 2 is deflated for stowage. The air within the tube 2 is exhausted through the filter 34.

The filter 8 may also be integrated into the wall of the tube 2 in various ways. For example, a portion or the entire tube wall may be made of filter material. The entire wall of the tube 2 may also be made of filter material.

Figure 5:
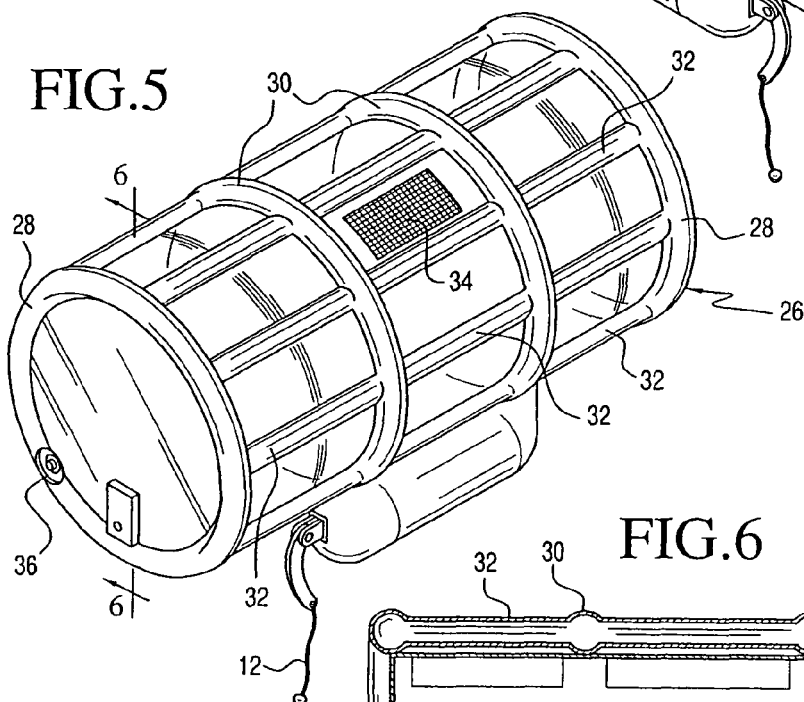
FIG. 5 is another embodiment of an emergency vision device, shown in its deployed form.

In operation, the lever 10 is operated in the conventional manner to release the content of the cylinder into the network of tubes 26, thereby inflating the tube 26 into the form shown in FIG. 5. The action of the network of tubes 26 taking on the expanded form as shown in FIG. 5 forces the tube 2 to also expand, since the tube 2 is attached to the network of tubes 26. The expanding tube 2 draws in ambient air through the filter 34 to equalize the pressure between the interior and the outside of the tube 2. Clear air then fills up the interior of the tube 2. The user then positions the device R between the user and the source of information, such an instrument panel, allowing him to read the information in spite of the smoke that may have invaded the space. After use, the tube 2 and the network of tubes 26 are deflated by compressing the tube 2, forcing the air inside through the filter 34, and allowing the gas within the network of tubes 26 to exhaust through the port 36.

The tube 2 may be disposed outside the network of tubes 26, as long as it is attached thereto. The tube 2 and the network of tubes 26 may be made from the same material and integrated into one unit.

The device R is advantageously lightweight, since it is completely supported by pressurized gas, without any metallic framework, such as a helical spring.

While this invention has been described as having preferred design, it is understood that it is capable of further modification, uses and/or adaptations following in general the principle of the invention and including such departures from the present disclosure as come within known or customary practice in the art to which the invention pertains, and as may be applied to the essential features set forth, and fall within the scope of the invention or the limits of the appended claims.

I claim:

1. An emergency vision device, comprising:
   a) a collapsible tube made of airtight material and having an expanded form and a deflated stowage form;
   b) first and second clear members disposed at respective first and second ends of said tube to enable a user to see through said tube and observe a source of information at a distal end of said tube while smoke or other particulate matter is in the environment;
   c) a portable gas cylinder having compressed clear gas;
   d) a valve assembly connected to said gas cylinder and having an outlet operably connected to the interior of said tube;
   e) said valve assembly being operable to release said clear gas to fill the interior of said tube to expand said tube to said expanded form;
   f) a hollow handle operably secured to said tube; and
   g) said cylinder is disposed within said handle.

2. An emergency vision device as in claim 1, and further comprising a closable port operably associated with said tube to allow the gas within said tube to be exhausted out when said tube is deflated to said stowage form.

3. An emergency vision device as in claim 1, and further comprising a light source to aid the user to see the source of information.

4. An emergency vision device as in claim 3 wherein said light source is disposed at one end of said tube.

5. An emergency vision device as in claim 3, wherein:
   a) said light source is a flashlight; and
   b) straps are secured to said tube and said flashlight.

6. An emergency vision device as in claim 1, wherein said tube is cylindrical.

7. An emergency vision device as in claim 1, wherein said tube is an airtight fabric.

8. An emergency vision device as in claim 1, wherein said clear members are plastic.

9. An emergency vision device as in claim 1, wherein said tube is transparent.

10. An emergency vision device as in claim 1, wherein:
    a) said valve assembly includes a lever; and
    b) said lever is operated to release gas into said tube.

* * * * *